United States Patent
Tamaki et al.

(10) Patent No.: US 6,309,203 B1
(45) Date of Patent: Oct. 30, 2001

(54) INJECTION APPARATUS FOR INJECTION MOLDING MACHINE

(75) Inventors: Masahiro Tamaki, Susono; Jun Koike, Sunto-gun, both of (JP)

(73) Assignee: Toshiba Kikai Kabushiki Kaisha, Tokyo (JP)

(*) Notice: Subject to any disclaimer, the term of this patent is extended or adjusted under 35 U.S.C. 154(b) by 0 days.

(21) Appl. No.: 09/191,189

(22) Filed: Nov. 13, 1998

(30) Foreign Application Priority Data

Nov. 13, 1997 (JP) .................................................. 9-329474

(51) Int. Cl.[7] .................................................. B29C 45/77
(52) U.S. Cl. .......................................... 425/145; 425/149
(58) Field of Search .................................. 425/145, 149, 425/150, 557

(56) References Cited

U.S. PATENT DOCUMENTS

| | | |
|---|---|---|
| 4,950,146 | 8/1990 | Adachi . |
| 5,206,034 * | 4/1993 | Yamazaki .............................. 425/149 |
| 5,362,222 | 11/1994 | Faig, et al. . |
| 5,421,712 | 6/1995 | Laing, et al. . |
| 5,499,915 * | 3/1996 | Fujita .................................. 425/557 |
| 5,645,868 * | 7/1997 | Reinhart .............................. 425/149 |

FOREIGN PATENT DOCUMENTS

| | | | |
|---|---|---|---|
| 195 36 565 A1 | 4/1997 | (DE) . | |
| 197 31 833 C1 | 1/1999 | (DE) . | |
| 230 488 | 8/1987 | (EP) . | |
| WO96/22183 | 7/1996 | (WO) . | |

* cited by examiner

*Primary Examiner*—Tim Heitbrink
(74) *Attorney, Agent, or Firm*—Pillsbury Winthrop LLP (57) ABSTRACT

An injection apparatus for a motor-driven injection molding machine comprised a barrel unit for heating and plasticating polymer material, a screw disposed in the barrel unit rotatably and movably in the axial direction, a first rotating shaft having one end connected to a rear end of the screw, a charging motor for driving the first rotating shaft for rotation, a ball screw mechanism consisting of a second rotating shaft having a threaded rod portion, and a threaded nut member engaging with the threaded rod portion, an injection carriage having a front plate for mounting the barrel unit thereon, and a rear plate for supporting the second rotating shaft at the rear end thereof, an injection motor for driving the ball screw mechanism, and an intermediate mount plate, disposed movably between the front plate and the rear plate, for linking the first rotating shaft to the second rotating shaft coaxially with a predetermined distance spaced apart between the rear end of the first rotating shaft and the front end of the second rotating shaft. Back pressure acting on the screw in a charging process can accurately be controlled without requiring a difficult control operation for controlling the injection motor and the charging motor for synchronous operation.

10 Claims, 4 Drawing Sheets

PRIOR ART

INJECTION APPARATUS FOR INJECTION MOLDING MACHINE

BACKGROUND OF THE INVENTION

1. Field of the Invention

The present invention relates to an injection apparatus for a motor-driven injection molding machine. In particular, it relates to an improvement that facilitates the control of back pressure during charging process.

2. Description of the Related Art

Figure 7:
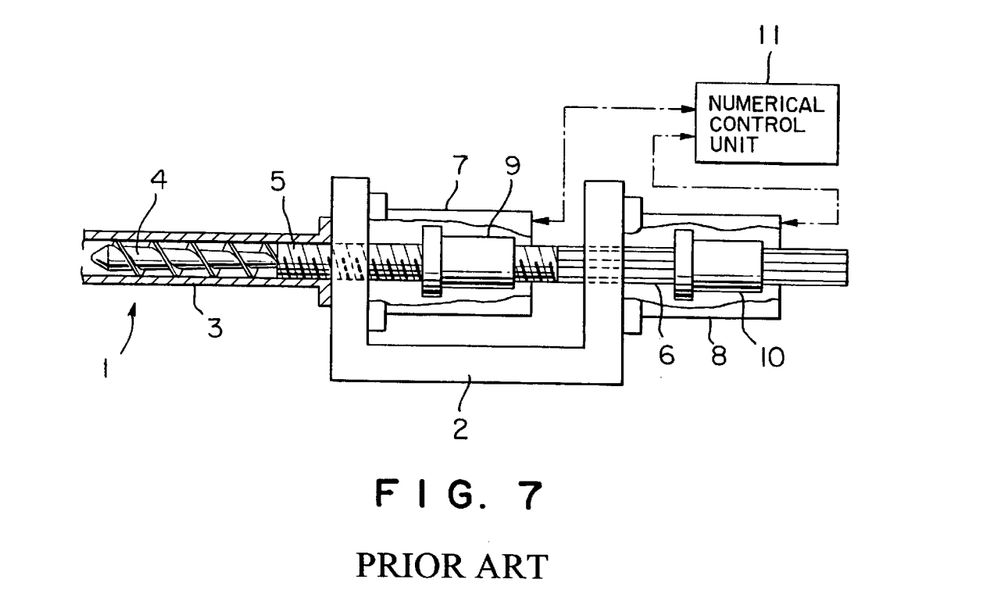
FIG. 7 is a partly sectional, schematic front view of a conventional injection unit for an motor-driven injection molding machine.

FIG. 7 shows an injection apparatus of a conventional motor-driven injection molding machine. The reference numeral 1 denotes an injection apparatus. A barrel unit 3 which is fed with plastic material is mounted on an injection carriage 2. The barrel unit 3 includes a heated barrel having an internal elongated cylindrical bore. A screw 4 is rotatably and axially movably disposed in the cylindrical bore of the heated barrel 3.

A ball screw 5 extends coaxially and integrally from a rear end portion of the screw 4. A spline shaft 6 is integrally connected to the rear end of the ball screw 5.

An injection motor 7 which is for use in the injection process and drives the ball screw 5 is installed in the injection carriage 2. A charging motor 8 which is for use in the charging process and drives the spline shaft 6 is as well installed in the rear end of the injection carriage 2. A rotor 9 of the injection motor 7 is designed to serve as a ball screw nut that engages with the ball screw 5. And a rotor 10 of the charging motor 8 is designed to serve as a spline nut which the spline shaft 6 is slidably fitted therethrough. A numerical control unit 11 controls the operation of the injection motor 7 and charging motor 8 so that the screw 4 moves forwardly in the injection process, or rotates in the charging process.

During the charging process, the spline shaft 6 permits the transmission of the rotation of the charging motor 8 to the screw 4 integral with the spline shaft 6 and ball screw 5. The screw 4 rotates and plasticizes the material fed into the barrel 3. The melt material accumulates in front of the screw 4, forcing back the screw 4 rearwardly.

During the injection process, the combination of the ball screw 5 and ball nut 9 converts the rotation of the injection motor 7 to the liner motion which causes the screw 4 to move forwardly(the leftward direction in the figure), whereby the screw 4 injects the molten material accumulated in front of the screw 4 into a mold cavity. The numerical control unit 11 controls the injection motor 7 to rotate and controls the charging motor 8 to keep from rotating, so as to enable the screw 4 to move forwardly.

The movement of the screw 4 in the charging process consists of the rotation for plastication and the retreat motion caused by the pressurized molten material accumulated in front of the screw 4. The rotation of the screw 4 simultaneous with retreat is properly achieved, in conjunction with the injection motor 7 to control of the back pressure to be applied on the screw 4.

However, in this prior-art injection apparatus, the ball screw 5 is made integral with the spline shaft 6 and it is so arranged that the charging motor 8 rotates the spline nut 10 fitted onto the spline shaft 6. Therefore, while the charging motor 8 rotates the spline shaft 6 to cause the screw 4 to rotate, the ball screw 5 rotates inevitably. This inevitable rotation of the ball screw 5 brings the screw 4 to move rearwardly, regardless of the amount of the molten material forced forwardly by the rotating screw 4.

The prior-art injection apparatus provided with the charging motor 8 having such a structure that the spline shaft 6 passes through the rotor 10 involves following drawbacks to control the back pressure. The rotation of the rotor 10 prevents the spline shaft 6 from slipping axially through the rotor 10. That needs to apply a appropriate back pressure to the screw 4 to cause it to retreat at the velocity corresponding to the feed rate of the molten material. For that reason, it is difficult to control the charging motor 8 and injection motor 7 with the rotation of the former being synchronized with that of the latter. That fails in the precise control of the back pressure applied to the screw 4. As a result, The screw 4 is forced to retreat only by the pressure of the molten material.

SUMMARY OF THE INVENTION

An object of the present invention is to provide an injection apparatus for a motor-driven injection molding machine which enable to remove therefrom the above-described drawbacks that make it difficult to control the charging motor and injection motor synchronously, and to achieve the precise control of the back pressure applied to the screw.

According to a first aspect of the present invention, an injection apparatus for a motor-driven injection molding machine having a barrel unit for heating and plasticating polymer material and a screw disposed in the barrel unit rotatably and movably in the axial direction comprises a first rotating shaft having one end connected to a rear end of the screw, a charging motor for driving the first rotating shaft for rotation, a ball screw mechanism consisting of a second rotating shaft having a threaded rod portion, and a threaded nut member engaging with the threaded rod portion, an injection carriage having a front plate for mounting the barrel unit thereon, and a rear plate for supporting the second rotating shaft at the rear end thereof, an injection motor for driving the ball screw mechanism, and an intermediate mount plate, disposed movably between the front plate and the rear plate, for linking the first rotating shaft to the second rotating shaft coaxially with a predetermined distance spaced apart between the rear end of the first rotating shaft and the front end of the second rotating shaft.

According to a second aspect of the present invention, an injection apparatus for a motor-driven injection molding machine having a barrel unit for heating and plasticating polymer material, and a screw disposed in the barrel unit rotatably and movably in the axial direction comprises a first rotating shaft having one end connected to a rear end of the screw, a ball screw mechanism consisting of a second rotating shaft having a threaded rod portion, and a threaded nut member engaging with the threaded rod portion, an injection carriage having a front plate for mounting the barrel unit thereon, and a rear plate for supporting the second rotating shaft at the rear end thereof, an intermediate mount plate, disposed movably between the front plate and the rear plate, for linking the first rotating shaft to the second rotating shaft coaxially with a predetermined distance spaced apart between the rear end of the first rotating shaft and the front end of the second rotating shaft, a charging motor for driving the first rotating shaft for rotation, and mounted on the intermediate mount plate, and an injection motor for driving the threaded nut member of the ball screw mechanism for rotation, and mounted on the rear plate of the injection carriage.

According to a third aspect of the present invention, an injection apparatus for a motor-driven injection molding machine having a barrel unit for heating and plasticating polymer material, and a screw disposed in the barrel unit rotatably and movably in the axial direction, comprises a first rotating shaft having one end connected to a rear end of the screw, a second rotating shaft having a threaded rod portion, a threaded nut member engaging with the threaded rod portion, an injection carriage having a front plate for mounting the barrel unit thereon, and a rear plate with the threaded nut member fixed thereon, an intermediate mount plate, disposed movably between the front plate and the rear plate, for linking the first rotating shaft to the second rotating shaft coaxially with a predetermined distance spaced apart between the rear end of the first rotating shaft and the front end of the second rotating shaft, a charging motor for driving the first rotating shaft for rotation, and mounted on the intermediate mount plate, and an injection motor for driving the second rotating shaft for rotation, and mounted on the intermediate mount plate.

According to a fourth aspect of the present invention, an injection apparatus for a motor-driven injection molding machine having a barrel unit for heating and plasticating polymer material, and a motor-driven screw disposed in the barrel unit rotatably and movably in the axial direction comprises a first rotating shaft having one end connected to a rear end of the screw, a second rotating shaft having a threaded rod portion, an injection carriage having a front plate for mounting the barrel unit thereon, and a rear plate for supporting the second rotating shaft at the rear end thereof, an injection motor for driving the second rotating shaft for rotation, and mounted on the rear plate of the injection carriage, an intermediate mount plate disposed movably between the front plate and the rear plate, a charging motor for driving the first rotating shaft for rotation, and mounted on the intermediate mount plate, and a threaded nut member fixed on the intermediate mount plate and engaging with the threaded rod portion of the first rotating shaft with a predetermined distance spaced apart coaxially between the rear end of the first rotating shaft and the front end of the second rotating shaft.

According to the present inventions, it is not necessary to perform difficult motor control based on the synchronization between the charging motor and the injection motor as in the prior apparatus and it is possible to control the charging motor and/or the injection motor independently, and to perform the proper charging operation by apply appropriate back pressure to the screw with a high precision.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

First Embodiment

Figure 1:
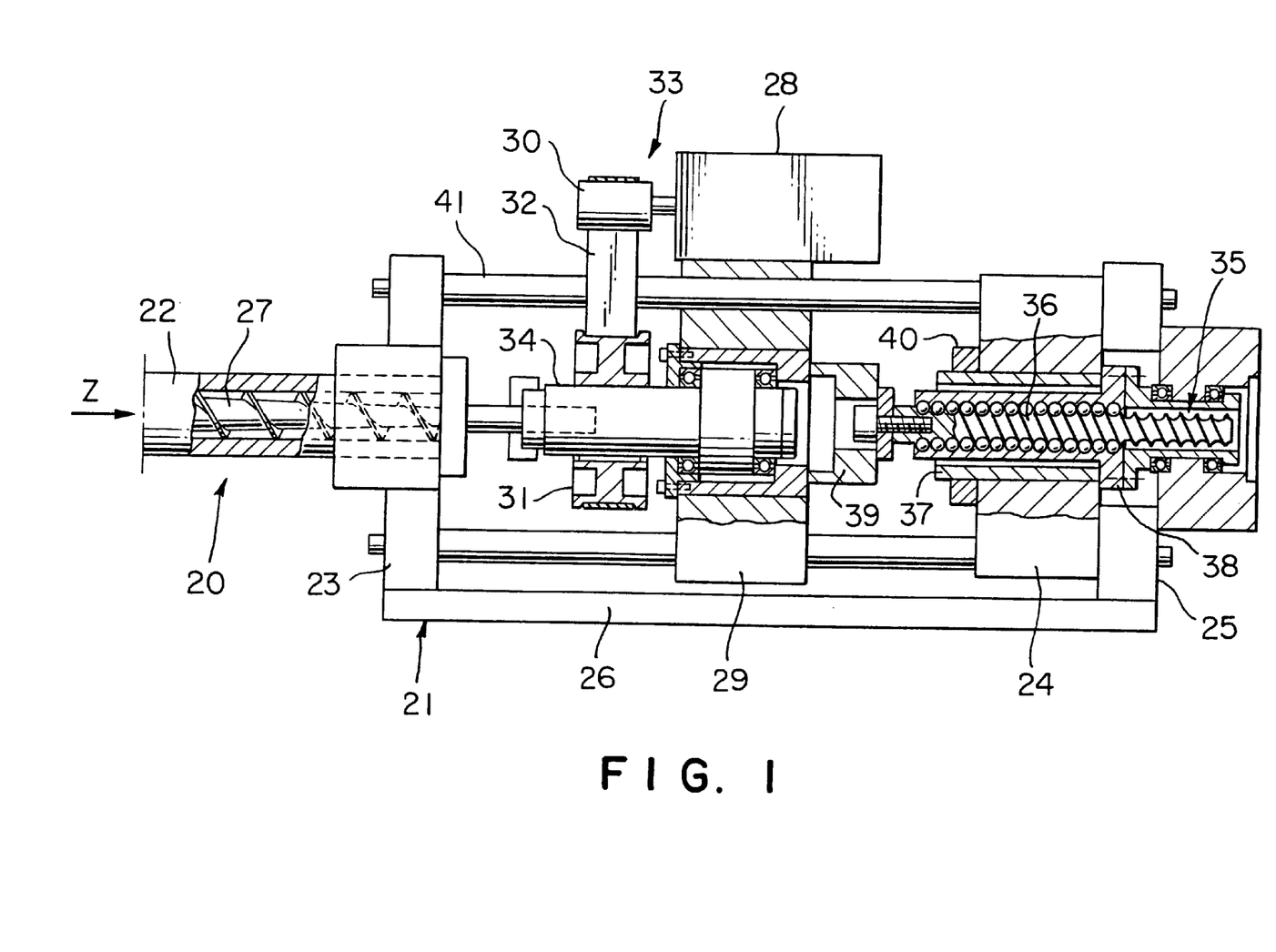
FIG. 1 is a partly sectional, schematic front view of an injection apparatus in a first embodiment according to the present invention for an motor-driven injection molding machine.

A first embodiment of the present invention will be explained with reference to FIGS. 1 and 2. The reference numeral 20 denotes an injection apparatus and 21 denotes an injection carriage. The injection carriage 21 includes a bottom plate 26, a front plate 23 disposed at the front end of the bottom plate 26, and a rear plate 25 disposed to the rear end of the bottom plate 26. The barrel unit 22 is mounted on the front plate 23, and an injection motor 24 is fixed onto the rear plate 25. The barrel unit 22 is provided with a heated barrel which has a internal elongated cylindrical bore. A screw 27 is disposed in the bore of the barrel unit 22 so as to be able to rotate and to move in the axial direction. A first rotating shaft 34 is connected to the rear end portion (a right end part as viewed in FIG. 1) of the screw 27. The first rotating shaft 34 is supported rotatably by bearings on an intermediate mounting plate 29 disposed movably between the front plate 23 and the rear plate 25. A charging motor 28 drives the first rotating shaft 34 for rotation through a power transmitting mechanism 33 composed of a belt drive transmission.

Figure 2:
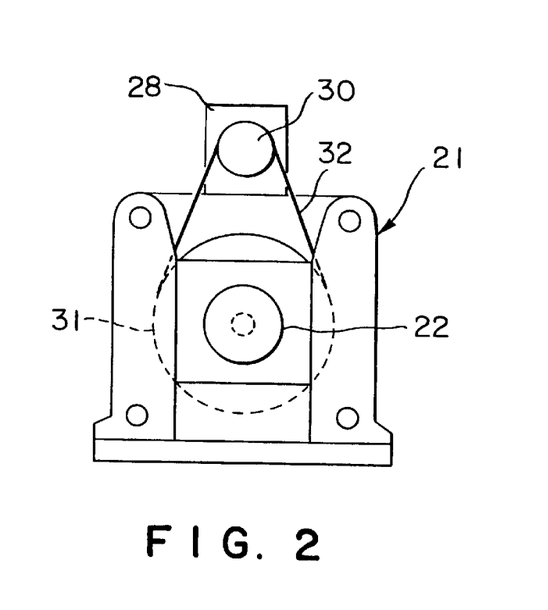
FIG. 2 is an end view taken in the direction of the arrow Z in FIG. 1.

As shown in FIG. 2, the charging motor 28 is linked to a first pulley 30 for synchronous belt drive in order to transmit the drive power therefrom to the first rotating shaft 34. A second pulley 31 for synchronous belt drive is attached to the first rotating shaft 34. A synchronous belt 32 connect the first pulley 30 and second pulley 31, whereby it is arranged to transmit the drive power of the charging motor 28 to the first rotating shaft 34.

A second rotating shaft 36 is linked to the intermediate mount plate 29 in alignment with the first rotating shaft 34 with a predetermined distance spaced apart from the rear end of the first rotating shaft 34, so that the second rotating shaft 36 is free from interference due to the rotation of the first rotating shaft 34. The second rotating shaft 36 has a threaded rod portion 35 which is adapted to serve as a threaded rod of a ball screw mechanism with a front end thereof abutting against a rear end surface of the intermediate mount plate 29.

A rotor 37 of the injection motor 24 formed integrally with a threaded nut member 38, which is adapted to serve as a threaded nut of the ball screw mechanism, is linked in engagement with the threaded rod portion 35 of the second rotating shaft 36. The rotor 37 of the injection motor 24 causes to rotate the threaded nut member 38 to move the second rotating shaft 36 in the axial direction. In an injection process, the second rotating shaft 36 is capable to apply the trust force to the intermediate mounting plate 29 to make the screw 27 move forward (to the left as viewed in FIG. 1).

In this embodiment, a load cell 39 for measuring the thrust force exerted to the intermediate mount plate 29 is disposed between the end surface of the intermediate mount plate 29 and the front end of the second rotating shaft 36 to detect back pressures applied to the screw 27 during a charging process. A rotary encoder 40 for measuring the angle of revolution of the rotor 37 is associated with the outer circumference of the rotor 37 for the purpose of the position control of the screw 27 during the injection process and the charging process.

Guide bars 41 extending through the intermediate mount plate 29 are placed parallel to the axis of the screw 27 between the front plate 23 and the rear plate 25 of the injection carriage 21. The movement of the intermediate mount plate 29 during the charging process and the injection process is guided by the guide bars 41. The guide bars 41 need not necessarily be extended between the front plate 23 and the rear plate 25 of the injection carriage 21. A substitute for the guide bars 41 may be spanned between two support legs placed on the bottom plate 26 of the injection carriage 21, provided that the guide bars 41 extending through the intermediate mount plate 29 run parallel to the axis of the screw 27.

Operation of the injection unit thus constructed will be described hereinafter.

In the injection process, electrical power is applied to the injection motor 24, and the rotor 37 rotates together with the threaded nut member 38. The rotational power of the injection motor 24 is converted to a thrust force by the threaded nut member 38 engaging with the threaded rod portion 35 of the second rotating shaft 36 to drive the second rotating shaft 36 for axial movement. The thrust force is transmitted to the intermediate mount plate 29 and the first rotating shaft 34 to move the screw 27 in the axial direction. Consequently, the screw 27 is forced to move to the left direction in FIG. 1, and injects the molten material accumulated in front of the screw 27 into a mold cavity (not shown).

In the charging process, electrical power is applied to the charging motor 28 to drive the first rotating shaft 34 through the power transmitting mechanism 33 and the screw 27 connected to the first rotating shaft 34 is rotated. Resin pellets fed through a inlet, not shown, into the barrel unit 22 is plasticated by heater element ( not shown) and the shearing action of the rotating screw 27. The rotation of the screw 27 causes the molten material to flow forward, and the molten material is accumulate and charged in front of the screw 27. The screw 27 retreats (to the right as viewed in FIG. 1) accompanying with rotation, due to the pressure of the molten material accumulated in front of the screw 27.

In the charging process, the first rotating shaft 34 rotates and retreats together with the intermediate mount plate 29 while the screw 27 moves rearward. However, the first rotating shaft 34 and the second rotating shaft 36 are linked through the intermediate mount plate 29 so that the rear end of the first rotating shaft 34 is spaced from the front end of the second rotating shaft 36, which is free from interference due to the rotation of the first rotating shaft 34. That provides a smooth retreat motion of the screw 27 with appropriate back pressure applied thereto, while the injection motor 24, which leaves the threaded nut member 38 rotating freely, permits the second rotating shaft 36 to move rearward. Consequently, during the charging process, unlike the conventional injection apparatus as shown in FIG. 7, in which the charging motor and the injection motor are necessarily driven synchronously with complicated back pressure control, the appropriate back pressure can be applied to the screw 27 by braking the molten material accumulated in front of the screw 27 with only the injection motor 24 alone being controlled.

According to the embodiment, in the case of transmitting the power of the charging motor 28 to the first rotating shaft 34 by using the synchronous belt 32 and the pulleys 30, 31 in the charging process, it is possible to achieve the transmission with an appropriate reduction ratio between the pulley 30 and the pulley 31 which decreases the revolution rate of the screw 27. As a result, it is possible to decrease the motor torque and the current supplied to the charging motor 28, and to enable to use an amplifying element with smaller capacity.

Second Embodiment

An injection apparatus 50 in a second embodiment according to the present invention will be described with reference to FIG. 3, in which parts like or corresponding to those of the foregoing embodiment are designated by the same reference characters. In this embodiment, the injection motor mounted on the intermediate mount plate drives the second rotating shaft directly and the threaded nut is fixed on the rear plate.

Figure 3:
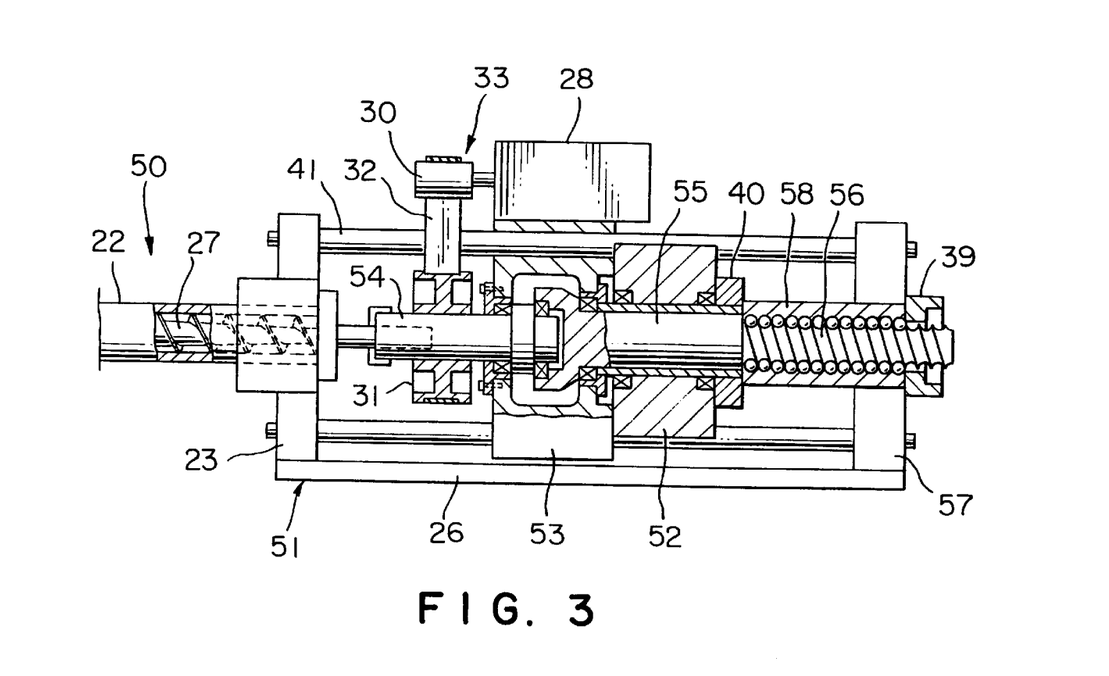
FIG. 3 is a partly sectional, schematic front view of an injection apparatus in a second embodiment according to the present invention for an motor-driven injection molding machine.

Referring to FIG. 3, an injection carriage 51 of the injection apparatus includes a bottom plate 26, a front plate 23 disposed at the front end of the bottom plate 26, and a rear plate 57 disposed to the rear end of the bottom plate 26. The barrel unit 22 is mounted on the front plate 23, and is provided with a heated barrel in which a screw 27 is disposed in the bore of the barrel unit 22 so as to be able to rotate and to move in the axial direction. A first rotating shaft 54 is connected to the rear end portion (a right end part as viewed in FIG. 3) of the screw 27. The first rotating shaft 54 is supported rotatably by bearings on an intermediate mount plate 53 disposed movably between the front plate 23 and the rear plate 57. The charging motor 28, which is mounted on the intermediate mount plate 53, drives the first rotating shaft 54 for rotation through a power transmitting mechanism 33 composed of a belt drive transmission which has the same mechanism as shown as FIG. 2.

A second rotating shaft 55 is driven for rotation by an injection motor 52 which is mounted on the intermediate mount plate 53. The second rotating shaft 55 is linked by the intermediate mount plate 53 in alignment with the first rotating shaft 54 with a predetermined distance spaced apart from the rear end of the first rotating shaft 54, so that the second rotating shaft 55 is free from interference due to the rotation of the first rotating shaft 54. The second rotating shaft 55 has a threaded rod portion 56 which is adapted to serve as a threaded rod of a ball screw mechanism.

A threaded nut member 58, which is adapted to serve as a threaded nut of the ball screw mechanism, is fixed on the rear plate 57 and linked in engagement with the threaded rod portion 56 of the second rotating shaft 55. The injection motor 52 rotates the second rotating shaft 55 to move it in the axial direction, so that the second rotating shaft 55 is capable to apply the trust force to the intermediate mount plate 53 to make the screw 27 move forward (to the left as viewed in FIG. 3).

In this embodiment, a load cell 39 for measuring the thrust force exerted to the intermediate mounting plate 53 is disposed at rear end of the second rotating shaft 55 to detect back pressures applied to the screw 27 during a charging process. A rotary encoder 40 for measuring the angle of revolution of the injection motor 52 is associated with the rotor thereof for the purpose of the position control of the screw 27 during the injection process and the charging process. Guide bars 41 extending through the intermediate mount plate 29 are placed parallel to the axis of the screw 27 between the front plate 28 and the rear plate 57 of the injection carriage 51. The movement of the intermediate mount plate 53 during the charging process and the injection process is guided by the guide bars 41 in the same manner as the first embodiment.

The operation of the injection unit thus constructed will be described hereinafter.

In the injection process, electrical power is applied to the injection motor 52 to rotate the second rotating shaft 55. The rotational power of the injection motor 52 is converted to a thrust force by the threaded nut member 58 engaging with the threaded rod portion 56 of the second rotating shaft 55 to drive it for axial movement. The thrust force is transmitted to the intermediate mount plate 53 and the first rotating shaft 54 to move the screw 27 in the axial direction. Consequently, the screw 27 is forced to move to the left direction in FIG. 3, and injects the molten material accumulated in front of the screw 27 into a mold cavity (not shown).

In the charging process, electrical power is applied to the charging motor 28 to drive the first rotating shaft 54 through the power transmitting mechanism 33 and the screw 27 connected to the first rotating shaft 54 is rotated. Resin pellets fed through a inlet, not shown, into the barrel unit 22 is plasticated by heater element (not shown) and the shearing action of the rotating screw 27. The rotation of the screw 27 causes the molten material to flow forward, and the molten material is accumulated and charged in front of the screw 27. The screw 27 retreats (to the right as viewed in FIG. 3) accompanying with rotation, due to the pressure of the molten material accumulated in front of the screw 27.

During the charging process, the first rotating shaft 54 rotates and retreats together with the intermediate plate 53 while the screw 27 moves rearward. However, the first rotating shaft 54 are linked to the second rotating shaft 55 through the intermediate mount plate 53 so that the second rotating shaft 55 is free from interference due to the rotation of the first rotating shaft 54. That provides a smooth retreat motion of the screw 27 with appropriate back pressure applied thereto, while the injection motor 52, which leaves the second rotating shaft 55 rotating freely, permits the second rotating shaft 55 to move rearward. Consequently, during the charging process, unlike the conventional injection apparatus as shown in FIG. 7, in which the charging motor and the injection motor are necessarily driven synchronously with complicated back pressure control, the appropriate back pressure can be applied to the screw 27 by braking the molten material accumulated in front of the screw 27 with only the injection motor 52 alone being controlled.

Third Embodiment

An injection unit 60 in a third embodiment according to the present invention will be described hereinafter with reference to FIG. 4. All the elements common to all embodiments have the same reference numerals. In this embodiment, unlike the second embodiment, the charging motor mounted on the intermediate mount plate drives the first rotating shaft directly without the power transmission mechanism as shown in FIG. 2.

Figure 4:
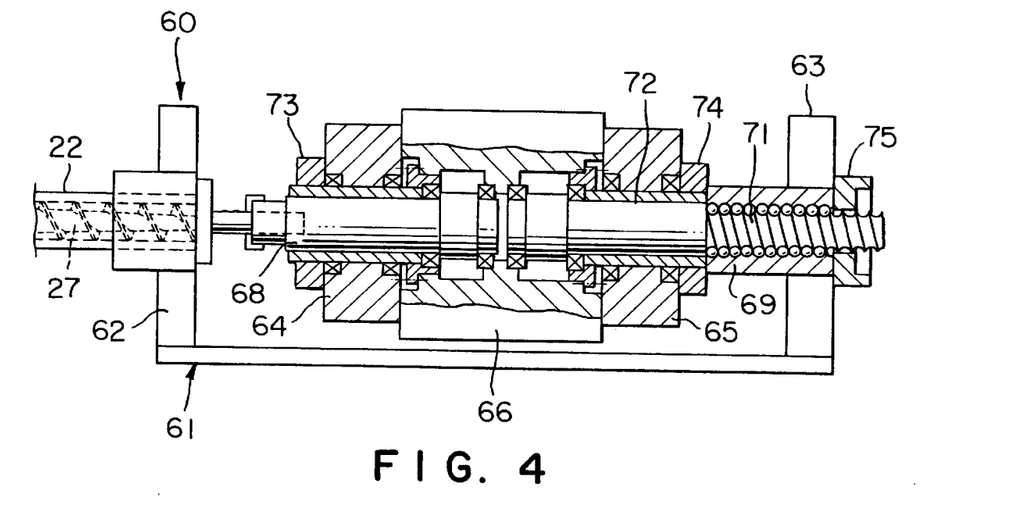
FIG. 4 is a partly sectional, schematic front view of an injection apparatus in a third embodiment according to the present invention for an motor-driven injection molding machine.

Referring to FIG. 4, the barrel unit 22 is mounted on a front plate 62 of an injection carriage 61, and is provided with a heated barrel in which a screw 27 is disposed in the bore of the barrel unit 22 so as to be able to rotate and to move in the axial direction. A first rotating shaft 68 is connected to the rear end portion of the screw 27. The first rotating shaft 68 is supported rotatably by bearings on an intermediate mount plate 66 which is disposed movably between the front plate 62 and a rear plate 63. A charging motor 64 which drives first rotating shaft 68 is mounted on the front end of the intermediate mount plate 66, and an injection motor 65 is mounted on the rear end of the intermediate mount plate 66.

A second rotating shaft 72 driven for rotation by the injection motor 65 is linked to the intermediate mount plate 66 in alignment with the first rotating shaft 68 with a predetermined distance spaced apart from the rear end of the first rotating shaft 68, so that the second rotating shaft 72 is free from interference due to the rotation of the first rotating shaft 68. The second rotating shaft 72 has a threaded rod portion 71 which is adapted to serve as a treaded rod of a ball screw mechanism. A threaded nut member 69, which is adapted to serve as a threaded nut of the ball screw mechanism, is fixed on the rear plate 63 and linked in engagement with the threaded rod portion 71 of the second rotating shaft 72.

In the injection process, electrical power is applied to the injection motor 65 to rotate the second rotating shaft 72. The rotational power of the injection motor 65 is converted to a thrust force by the threaded nut member 69 engaging with the threaded rod portion 71 of the second rotating shaft 72 to drive it for axial movement. The thrust force is transmitted to the intermediate mount plate 66 and the first rotating shaft 68 to move the screw 27 in the axial direction. Consequently, the screw 27 is forced to move to the left direction in FIG. 4, and injects the molten material accumulated in front of the screw 27 into a mold cavity (not shown).

In the charging process, electrical power is applied to the charging motor 64 to drive the first rotating shaft 68 and the screw 27. Resin pellets fed into the barrel unit 22 is plasticated, and the molten material is accumulated and charged in front of the screw 27. The screw 27 retreats (to the right as viewed in FIG. 4) accompanying with rotation, due to the pressure of the molten material accumulated in front of the screw 27.

During the charging process, the first rotating shaft 68 rotates and retreats together with the intermediate mount plate 66 while the screw 27 moves rearward. However, the first rotating shaft 68 are linked to the second rotating shaft 72 through the intermediate mount plate 66 so that the second rotating shaft 72 is free from interference due to the rotation of the first rotating shaft 68. That provides a smooth retreat motion of the screw 27 with appropriate back pressure applied thereto, while the injection motor 65, which leaves the second rotating shaft 72 rotating freely, permits the second rotating shaft 55 to move rearward. Consequently, unlike the conventional injection apparatus as shown in FIG. 7, the charging motor 64 and the injection motor 65 are need not to be driven synchronously with complicated back pressure control. And the appropriate back pressure can be applied to the screw 27 by braking the molten material accumulated in front of the screw 27 with only the injection motor 65 alone being controlled.

In this embodiment, rotary encoders 73, 74 measures the angle of rotation of the charging motor 64 and the injection motor 65, respectively. A load cell 75 measures the thrust force exerting on the intermediate mount plate 66. In FIG. 4, guide bars for guiding the intermediate mounting plate 66 fixedly holding the charging motor 64 and the injection motor 65 are omitted for drawing.

Fourth Embodiment

Figure 5:
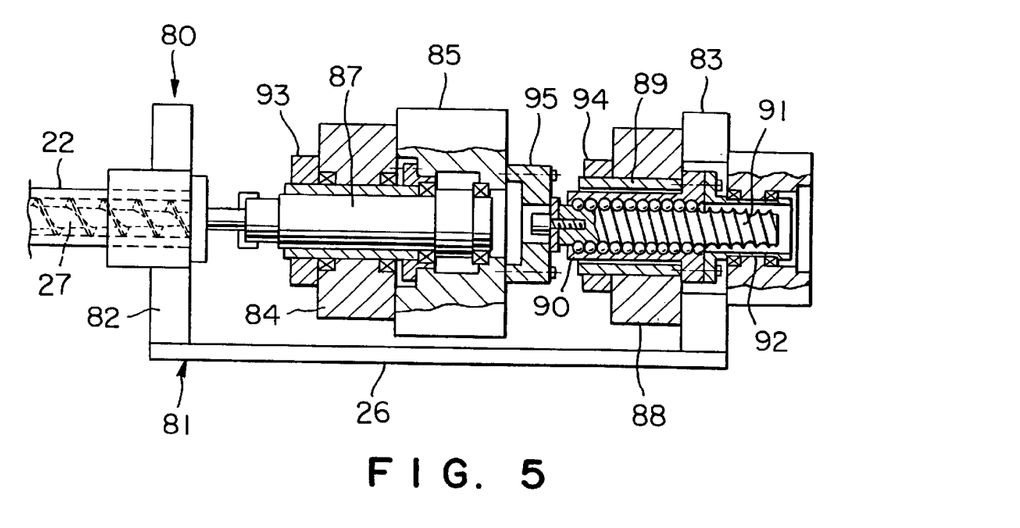
FIG. 5 is a partly sectional, schematic front view of an injection apparatus in a fourth embodiment according to the present invention for an motor-driven injection molding machine.

An injection unit 80 in a fourth embodiment according to the present invention will be described hereinafter with reference to FIG. 5. All the elements common to all embodiments have the same reference numerals. In this embodiment, unlike the first embodiment, the charging motor mounted on the intermediate mount plate drives the first rotating shaft directly without the power transmission mechanism as shown in FIG. 2.

An injection carriage 81 includes a bottom plate 26, a front plate 82 disposed at the front end of the bottom plate 26, and a rear plate 83 disposed to the rear end of the bottom plate 26. The barrel unit 22 is mounted on the front plate 82, and is provided with a heated barrel in which a screw 27 is disposed in the bore of the barrel unit 22 so as to be able to rotate and to move in the axial direction. A first rotating shaft 87 is connected to the rear end portion of the screw 27. The first rotating shaft 87 is supported rotatably by bearings on an intermediate mount plate 85 disposed movably between the front plate 82 and the rear plate 83. The charging motor 84, which is mounted on the intermediate mount plate 85, drives the first rotating shaft 87 for rotation directly. An injection motor 88 is mounted on the rear plate 83 of the injection carriage 81.

A second rotating shaft 92, which is driven by the injection motor 88, is linked to the intermediate plate 85 in alignment with the first rotating shaft 87 with a predetermined distance spaced apart from the rear end of the first rotating shaft 87, so that the second rotating shaft 92 is free from interference due to the rotation of the first rotating shaft 87. The second rotating shaft 92 has a threaded rod portion 91 which is adapted to serve as a threaded rod of a ball screw mechanism with a front end thereof abutting against a load cell 95 attached to a rear end surface of the intermediate mounting plate 85.

A rotor 89 of the injection motor 88 formed integrally with a threaded nut member 90, which is adapted to serve as a threaded nut of the ball screw mechanism, is linked in engagement with the threaded rod portion 91 of the second rotating shaft 92. The injection motor 88 drives the threaded nut member 90 to move the second rotating shaft 92, which can apply the trust force to the intermediate mount plate 85.

In this embodiment, rotary encoders 93, 94 measures the angle of rotation of the charging motor 84 and the injection motor 88, respectively. The load cell 95 measures the thrust force exerting on the intermediate mount plate 85. In FIG. 5, guide bars for guiding the intermediate mount plate 85 fixedly holding the charging motor 84 are omitted for drawing.

In the injection process, electrical power is applied to the injection motor 88, and the rotor 89 rotates together with the threaded nut member 90. The rotational power of the injection motor 88 is converted to a thrust force by the threaded nut member 89 engaging with the threaded rod portion 91 of the second rotating shaft 92 to drive it for axial movement. The thrust force is transmitted to the intermediate mount plate 85 and the first rotating shaft 87 to move the screw 27 in the axial direction. Consequently, the screw 27 is forced to move to the left direction in FIG. 5, and injects the molten material accumulated in front of the screw 27 into a mold cavity (not shown).

In the charging process, electrical power is applied to the charging motor 84 to drive the first rotating shaft 87, and the screw 27 connected to the first rotating shaft 34 is rotated. Resin pellets fed into the barrel unit 22 is plasticated by heater element (not shown) and the shearing action of the rotating screw 27, and the molten material is accumulate and charged in front of the screw 27.

The screw 27 retreats (to the right as viewed in FIG. 5) accompanying with rotation, due to the pressure of the molten material accumulated in front of the screw 27. The first rotating shaft 87 rotates and retreats together with the intermediate mounting plate 85, which forces the second rotating shaft 92 to move rearward (to the right as viewed in FIG. 5). The threaded nut 90, which is free to rotate, allows the screw 27 to retreat to the initial position for the injection process.

While the screw 27 moves rearward, the first rotating shaft 87 and the second rotating shaft 92 are linked through the intermediate mount plate 85 so that the rear end of the first rotating shaft 85 is spaced from the front end of the second rotating shaft 92. That provides a smooth retreat motion of the screw 27 with appropriate back pressure applied thereto during the charging process. Unlike the conventional injection apparatus as shown in FIG. 7, in which the charging motor and the injection motor are necessarily driven synchronously with complicated back pressure control, the appropriate back pressure can be applied to the screw 27 by braking the molten material accumulated in front of the screw 27 with only the injection motor 88 alone being controlled.

Fifth Embodiment

An injection unit 100 in a fifth embodiment according to the present invention will be described hereinafter with reference to FIG. 6. All the elements common to all embodiments have the same reference numerals.

Figure 6:
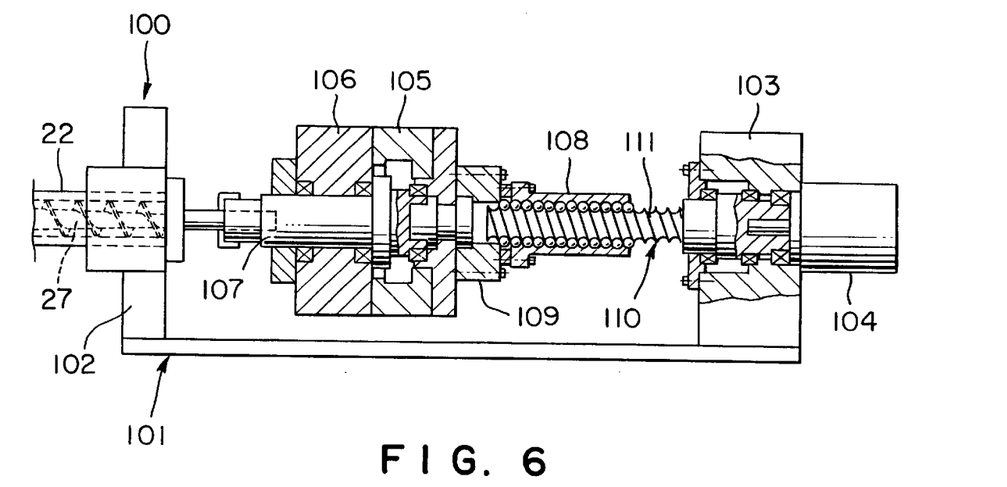
FIG. 6 is a partly sectional, schematic front view of an injection apparatus in a fifth embodiment according to the present invention for an motor-driven injection molding machine.

Referring to FIG. 6, the barrel unit 22 is mounted on a front plate 102 of an injection carriage 101, and is provided with a heated barrel in which a screw 27 is disposed in the bore of the barrel unit 22 so as to be able to rotate and to move in the axial direction. A first rotating shaft 107 is connected to the rear end portion of the screw 27. The first rotating shaft 107 is supported rotatably by bearings on an intermediate mount plate 105 which is disposed movably between the front plate 102 and a rear plate 103. A charging motor 106 which drives first rotating shaft 107 is mounted on the front end of the intermediate mount plate 105, and an injection motor 104 is mounted on the rear end of the rear plate 103.

A second rotating shaft 110, which is driven for rotation by the injection motor 104, is supported rotatably by bearings on the rear plate 103. The second rotating shaft 110 has a threaded rod portion 111 which is adapted to serve as a threaded rod of a ball screw mechanism. A threaded nut member 108, which is adapted to serve as a threaded nut of the ball screw mechanism, is fixed on a load cell 109 which is attached to intermediate mount plate 105. The threaded nut member 108 is linked in engagement with the threaded rod portion 111 of the second rotating shaft 110 in alignment with the first rotating shaft 107 with a predetermined distance spaced apart from the rear end of the first rotating shaft 107.

In this embodiment, the load cell 109 disposed between the intermediate mount plate 105 and the threaded nut member 108 measures the thrust force exerting on the intermediate mount plate 105. In FIG. 6, guide bars for guiding the intermediate mount plate 105 fixedly holding the charging motor 64 and the injection motor 106 are omitted for drawing.

In the injection process, electrical power is applied to the injection motor 104 to rotate the second rotating shaft 110. The rotational power of the injection motor 104 is converted to a thrust force by the threaded nut member 108 engaging with the threaded rod portion 111 of the second rotating shaft 110 to drive it for axial movement. The thrust force is transmitted to the intermediate mount plate 105 to move the screw 27 in the axial direction. Consequently, the screw 27 is forced to move to the left direction in FIG. 6, and injects the molten material accumulated in front of the screw 27 into a mold cavity (not shown).

In the charging process, electrical power is applied to the charging motor 106 to drive the first rotating shaft 107 and the screw 27. Resin pellets fed into the barrel unit 22 is plasticated, and the molten material is accumulated and charged in front of the screw 27. The screw 27 retreats (to the right as viewed in FIG. 6) accompanying with rotation, due to the pressure of the molten material accumulated in front of the screw 27. The first rotating shaft 107 rotates and retreats together with the intermediate mount plate 105. The threaded nut member 108 forces the second rotating shaft 110 to rotate and move rearward (to the right as viewed in FIG. 6 ). The second rotating shaft 110, which is free to rotate, allows the screw 27 to retreat to the initial position for the injection process.

The charging motor 106 dose not suffer any operational interference from the second rotating shaft 110 and the injection motor 104. Unlike the conventional injection apparatus as shown in FIG. 7, in which the charging motor and the injection motor are necessarily driven synchronously with complicated back pressure control, the appropriate back pressure can be applied to the screw 27 by braking the molten material accumulated in front of the screw 27 with only controlling the injection motor 104.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An injection apparatus for a motor-driven injection molding machine having a barrel unit configured to heat and plasticate polymer material, and a screw disposed in the barrel unit rotatably and movably in the axial direction, said apparatus comprising:

a first rotating shaft having one end connected to a rear end of the screw:

a second rotating shaft having a threaded rod portion;

a threaded nut member engaging with the threaded rod portion;

an injection carriage having a front plate for mounting the barrel unit thereon, and a rear plate fixed to the threaded nut member;

an intermediate mount plate, disposed movably between the front plate and the rear plate, configured to link the first rotating shaft to the second rotating shaft coaxially with a predetermined distance spaced apart between the rear end of the first rotating shaft and the front end of the second rotating shaft;

a charging motor for driving the first rotating shaft for rotation, and mounted on the intermediate mount plate, said charging motor having a rotor fitted coaxially with the first rotating shaft;

an injection motor for driving the second rotating shaft for rotation, and mounted on the intermediate mountplate, said injection motor having a rotor fitted coaxially with the second rotating shaft.

2. An injection apparatus for a motor-driven injection molding machine having a barrel unit configured to heat and plasticate polymer material, and a screw disposed in the barrel unit rotatably and movably in the axial direction, said apparatus comprising:

a first rotating shaft having one end connected to a rear end of the screw:

a ball screw mechanism consisting of a second rotating shaft having a threaded rod portion, and a threaded nut member engaging with the threaded rod portion;

an injection carriage having a front plate configured to mount the barrel unit thereon, and a rear plate configured to support the second rotating shaft at the rear end thereof;

an intermediate mount plate, disposed movably between the front plate and the rear plate, configured to link the first rotating shaft to the second rotating shaft coaxially with a predetermined distance spaced apart between the rear end of the first rotating shaft and the front end of the second rotating shaft;

a charging motor configured to drive the first rotating shaft for rotation, and mounted on the intermediate mount plate; and an injection motor configured to drive the threaded nut member of the ball screw mechanism for rotation, and mounted on the rear plate of the injection carriage, said charging motor having a rotor fitted coaxially with the first rotating shaft wherein said injection motor is provided with a rotor formed integrally with the threaded nut member of the ball screw mechanism.

3. The injection apparatus according to claim 2, wherein said apparatus is provided with a power transmission mechanism for transmitting the power of the charging motor to the first rotating shaft, consisted of a synchronous belt and pulleys for synchronous belt drive.

4. The injection apparatus for an injection molding machine, according to any one of claims 3, wherein the apparatus is provided with guide bars placed parallel to the axis of the screw and extending through the intermediate mounting plate so that the intermediate mounting plate is guided for sliding movement during an injection process and a charging process.

5. The injection apparatus according to claim 3 or 4, further comprising:

a load cell for measuring thrust force exerted to the intermediate mounting plate, said load cell being disposed opposite to the front end of the second rotating shaft; and a rotary encoder for detecting angle of revolution of the injection motor.

6. The injection apparatus for an injection molding machine, according to claim 5, wherein the apparatus is provided with guide bars placed parallel to the axis of the screw and extending through the intermediate mounting plate so that the intermediate mounting plate is guided for sliding movement during an injection process and a charging process.

7. An injection apparatus for a motor-driven injection molding machine having a barrel unit configured to heat and plasticate polymer material, and a screw disposed in the barrel unit rotatably and movably in the axial direction, said apparatus comprising:

a first rotating shaft having one end connected to a rear end of the screw;

a second rotating shaft having a threaded rod portion;

a threaded nut member engaging with the threaded rod portion;

an injection carriage having a front plate for mounting the barrel unit thereon, and a rear plate with the threaded nut member fixed thereon;

an intermediate mount plate, disposed movably between the front plate and the rear plate, configured to link the first rotating shaft to the second rotating shaft coaxially with a predetermined distance spaced apart between the rear end of the first rotating shaft and the front end of the second rotating shaft;

a charging motor configured to drive the first rotating shaft for rotation, and mounted on the intermediate mount plate;

an injection motor configured to drive the second rotating shaft for rotation, and mounted on the intermediate mount plate, said injection motor having a rotor fitted co-axially with the second rotating shaft.

8. The injection apparatus according to claim 7, wherein said apparatus is provided with a power transmission mechanism for transmitting the power of the charging motor to the first rotating shaft, consisted of a synchronous belt and pulleys for synchronous belt drive.

9. The injection apparatus according to claim 7 or 8, said apparatus further comprising:

a load cell for measuring thrust force exerting to the intermediate mounting plate, disposed at the rear end of the second rotating shaft; and a rotary encoder for detecting angle of revolution of the injection motor.

10. An injection apparatus for a motor-driven injection molding machine having a barrel unit configured to heat and plasticate polymer material, and a motor-driven screw disposed in the barrel unit rotatably and movably in the axial direction, said apparatus comprising;

a first rotating shaft having one end connected to a rear end of the screw;

a second rotating shaft having a threaded rod portion;

an injection carriage having a front plate for mounting the barrel unit thereon, and a rear plate for supporting the second rotating shaft at the rear end thereof;

an injection motor for driving the second rotating shaft for rotation, and mounted on the rear plate of the injection carriage;

an intermediate mount plate disposed movably between the front plate and the rear plate;

a charging motor for driving the first rotating shaft for rotation, and mounted on the intermediate mount plate;

a threaded nut member fixed on the intermediate mount plate and engaging with the threaded rod portion of the second rotating shaft with a predetermined distance spaced apart coaxially between the rear end of the first rotating shaft and the front end of the second rotating shaft; and a load cell configured to measure thrust force exerting to the intermediate mounting plate, said load cell being disposed between the front end of the second rotating shaft and the intermediate mounting plate.

* * * * *